United States Patent
Kim et al.

(10) Patent No.: US 11,430,089 B2
(45) Date of Patent: Aug. 30, 2022

(54) IMAGE PROCESSING METHOD AND IMAGE PROCESSING SYSTEM FOR GENERATING A CORRECTED IMAGE

(71) Applicant: Samsung Electronics Co., Ltd., Suwon-si (KR)

(72) Inventors: Tae-Ui Kim, Suwon-si (KR); Kai Guo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 150 days.

(21) Appl. No.: 16/896,517

(22) Filed: Jun. 9, 2020

(65) Prior Publication Data

US 2021/0012462 A1 Jan. 14, 2021

(30) Foreign Application Priority Data

Jul. 10, 2019 (KR) .................. 10-2019-0083310

(51) Int. Cl.
   *G06T 5/00* (2006.01)

(52) U.S. Cl.
   CPC .... *G06T 5/001* (2013.01); *G06T 2207/20081* (2013.01)

(58) Field of Classification Search
   CPC . G06T 2207/20081; G06T 2207/20084; G06T 5/001; G06K 9/03; G06K 9/036; G06K 9/6272
   See application file for complete search history.

(56) References Cited

U.S. PATENT DOCUMENTS

| | | | |
|---|---|---|---|
| 7,583,059 B2 | 9/2009 | Cho | |
| 8,643,701 B2 | 2/2014 | Nguyen et al. | |
| 9,918,072 B2 | 3/2018 | Kim et al. | |
| 2012/0182416 A1* | 7/2012 | Kawaguchi | H04N 9/3194 348/128 |
| 2016/0142627 A1 | 5/2016 | Chou et al. | |
| 2019/0026608 A1 | 1/2019 | Hsieh et al. | |
| 2019/0197670 A1* | 6/2019 | Ferrer | G06K 9/00268 |
| 2019/0377047 A1* | 12/2019 | Chen | G01R 33/4818 |
| 2020/0082508 A1* | 3/2020 | Alletto | G06T 5/50 |

(Continued)

FOREIGN PATENT DOCUMENTS

| | | |
|---|---|---|
| JP | H08505967 A | 6/1996 |
| JP | H11259445 A | 9/1999 |

(Continued)

*Primary Examiner* — Li Liu
(74) *Attorney, Agent, or Firm* — Muir Patent Law, PLLC

(57) ABSTRACT

An image correction method is provided. The image correction method includes receiving an input image from a first camera; receiving a guide image from a second camera; generating a corrected image by performing image correction on the input image using the guide image, the image correction being performed by an image generation unit having a pre-learned image generation parameter learned using a training image; generating a quality value of the corrected image by an image evaluation unit having an pre-learned image evaluation parameter learned using the training image; and performing the image correction on the corrected image again when the quality value of the corrected image is less than a set value, and outputting the corrected image as a final image when the quality value of the corrected image is greater than the set value.

20 Claims, 10 Drawing Sheets

(56) References Cited

U.S. PATENT DOCUMENTS

2020/0327662 A1* 10/2020 Liu .................. G16H 30/40
2020/0364864 A1* 11/2020 Shanbhag ............ G06T 7/0014
2021/0110522 A1* 4/2021 Ren ..................... G06T 3/40

FOREIGN PATENT DOCUMENTS

| KR | 101739394 B1 | 5/2017 |
|---|---|---|
| KR | 10-2018-0119753 A | 11/2018 |
| KR | 10-2019-0028880 A | 3/2019 |

* cited by examiner

IMAGE PROCESSING METHOD AND IMAGE PROCESSING SYSTEM FOR GENERATING A CORRECTED IMAGE

This application claims priority to Korean Patent Application No. 10-2019-0083310 filed Jul. 10, 2019, in the Korean Intellectual Property Office, the disclosure of which is incorporated herein by reference in its entirety.

BACKGROUND

1. Field of the Disclosure

The present disclosure relates to an image correction method and an image correction system.

2. Description of the Related Art

Research has been continuously conducted on a method of producing a depth map image from an image. A depth map may be used for out-focusing control to blur images spaced a certain distance or more from an image or used to bring a camera into focus. In addition, the depth map may be used to identify the distance between a camera and an object for autonomous driving and thus much attention has been paid to the use thereof.

A generative adversarial network which is one of unsupervised learning networks has drawn attention as a next-generation deep learning algorithm. The generative adversarial network includes a generative model for generating a realistic fake and a discriminative model for determining the authenticity of the fake generated by the generation model. In the generative adversarial network, the generative model and the discriminative model are learned in an adversarial manner.

SUMMARY

Aspects of the present disclosure provide a method of outputting an image obtained by correcting an image, which is input from an image device, by a pre-trained generator and a pre-trained evaluator.

According to some aspects of the present inventive concepts, an image correction method comprises receiving an input image from a first camera; receiving a guide image from a second camera; generating a corrected image by performing image correction on the input image using the guide image, the image correction being performed by an image generation unit having a pre-learned image generation parameter learned using a training image; generating a quality value of the corrected image by an image evaluation unit having an pre-learned image evaluation parameter learned using the training image; and performing the image correction on the corrected image again when the quality value of the corrected image is less than a set value, and outputting the corrected image as a final image when the quality value of the corrected image is greater than the set value.

According to some embodiments of the present inventive concepts, an image correction system comprises an image generation unit comprising: an image generation parameter storage configured to store a pre-learned image generation parameter, and an image generator configured to receive a guide image and an input image and generate a corrected image by correcting the input image using the pre-learned image generation parameter and the guide image; an image evaluation unit comprising: an image evaluation parameter storage storing a pre-learned image evaluation parameter; an image evaluator configured to receive the corrected image and generate a quality value of the corrected image using the pre-learned image evaluation parameter; and a determiner configured to output the corrected image when it is determined that the quality value is greater than a set value and input the corrected image as an input image to the image generation unit when it is determined that the quality value is less than the set value.

According to some embodiments of the present inventive concepts, an electronic device comprises a memory storing an image correction program; and at least one processor configured to execute the image correction program stored in the memory, wherein the image correction program is configured to generate, by the at least one processor, a corrected image from an input image using a guide image, generate a quality value of the corrected image, and perform image correction on the corrected image using the guide image until the quality value becomes greater than a set value, wherein the generation of the corrected image comprises generating the corrected image using an image generation parameter learned using a training image.

However, aspects of the present inventive concepts are not restricted to the one set forth herein. The above and other aspects of the present inventive concepts will become more apparent to one of ordinary skill in the art to which the present inventive concepts pertains by referencing the detailed description of the present inventive concepts given below.

BRIEF DESCRIPTION OF THE DRAWINGS

The above and other aspects and features of the present disclosure will become more apparent by describing exemplary embodiments thereof in detail with reference to the attached drawings, in which.

DETAILED DESCRIPTION OF THE EMBODIMENTS

Figure 1:
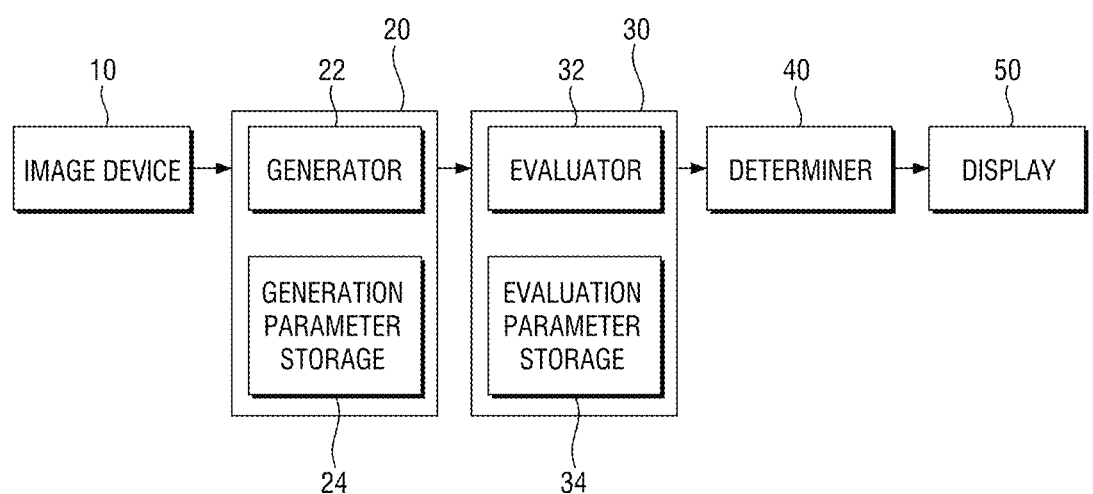
FIG. 1 is a schematic diagram for explaining an image correction system according to some embodiments of the present disclosure.

FIG. 1 is a schematic diagram for explaining an image correction system according to some embodiments of the present disclosure.

Referring to FIG. 1, an image correction system according to some embodiments of the present disclosure includes an image device 10, an image generation unit 20, an image evaluation unit 30, a determiner 40, and a display 50.

The image device 10 may include a plurality of camera modules. The image device 10 may include different camera modules.

For example, the image device 10 may include a wide-angle camera and a telephoto camera. Alternatively, the image device 10 may include a mono camera and an RGB camera. Alternatively, the image device 10 may include an infrared camera and an RGB camera. The image device 10 may be described as a camera having different components, each component including, for example, a lens and an image sensor. For example, a camera may include a wide-angle component and telephoto component, a monotone component and an RGB component, or an infrared component and an RGB component. The image device 10 may include software and hardware for capturing and storing the images, such as an image processor, memory, and driving and control software for controlling the capture, processing, and storage of images.

The image device 10 may provide the image generation unit 20 with images captured by the image device 10. The image generation unit 20 may be implemented with hardware and software, such as a microprocessor, memory, and computer programs configured to allow the image generation unit 20 to perform the various steps described herein.

For example, the image generation unit 20 may include an image generator 22 and a generation parameter storage 24.

The image generation unit 20 is configured to receive a guide image and an input image from the image device 10. The image generator 22 is configured to generate a corrected image of the input image. The generation parameter storage 24 may store a pre-learned image generation parameter. The pre-learned image generation parameter may be a parameter that is pre-learned and stored before the release of an electronic device including the image correction system according to some embodiments of the present disclosure.

The guide image input to the image generation unit 20 may include various types of guide images according to the image correction system.

According to some embodiments of the present disclosure, the image generation unit 20 may be used to generate the corrected image of the input image by using the pre-learned image generation parameter using an unsupervised learning network. The unsupervised learning network may be a generative adversarial networks (GANs) and the image generation unit 20 may be a generator of a GAN. The image generation unit 20 may learn or be trained to generate the corrected image that is close to a real image. The pre-learned image generation parameter may be a parameter of the generator of the GAN to generate the corrected image of the input image. The goal of the image generator 22 is to fool or trick the image evaluation unit 30 into determining that the corrected image is the real image. The image generation unit 20 may generate the corrected image so that the image evaluation unit 30 believes the corrected image is the real image. For example, the real image is a target image that the image generation unit 20 is trained to try to generate as the corrected image for the input image.

The image evaluation unit 30 may include an image evaluator 32 and an evaluation parameter storage 34. The image evaluation unit 30 may be implemented with hardware and software, such as a microprocessor, memory, and computer programs configured to allow the image evaluation unit 30 to perform the various steps described herein.

The image evaluation unit 30 is configured to receive a corrected image from the image generation unit 20. The image evaluator 32 is configured to determine whether the corrected image is the real image, or the corrected image is an image generated by the image generation unit 20. The image evaluator 32 is configured to generate a quality value of the corrected image generated by the image generation unit 20. The quality value of the corrected image may be a probability that the corrected image generated by the image generation unit 20 is the real image. For example, the quality value of the corrected image is a value between 0 and 1. The quality value closer to 1 may indicate a higher probability that the corrected image is the real image and the quality value closer to 0 may indicate a lower probability that the corrected image is the real image. The evaluation parameter storage 34 may store a pre-learned image evaluation parameter. The pre-learned image evaluation parameter may be a parameter that is pre-learned and stored before the release of an electronic device including the image correction system according to some embodiments of the present invention.

According to some embodiments of the present disclosure, the image evaluation unit 30 may determine whether the corrected image generated by the image generator unit 20 is the real image, and generate a quality value that is a probability the corrected image generated by the image generation unit 20 is the real image using the unsupervised learning network. The unsupervised learning network may be generative adversarial networks (GANs) and the image evaluation unit 30 may be a discriminator module of a GAN. The image evaluation unit 30 may learn or be trained to whether the corrected image is the real image or the corrected image is the image generated by the image generation unit 20, and generate a quality value that is a probability the corrected image generated by the image generation unit 20 is the real image. The pre-learned image evaluation parameter may be a parameter of the discriminator of the GAN to determine whether the corrected image generated by the image generation unit 20 is the real image. The determiner 40 may receive the quality value of the corrected image from the image evaluation unit 30. The determiner 40 may determine whether the quality value of the corrected image is greater than a set value. The determiner 40 may be implemented with hardware and software, such as a microprocessor, memory, and computer programs configured to allow the determiner 40 to perform the various steps described herein.

The display 50 may be a visual display, such a screen or other display. For example, the display 50 may be a display screen having pixels and implemented with LCD or LED technology.

It should be noted that the image device 10, generation unit 20, image evaluation unit 30, determiner 40, and display 50 may be implemented as separate units or modules, or may be combined together at least in part, for example, by sharing some of the same processing and/or storage hardware. Also, in some embodiments, the image device 10, generation unit 20, image evaluation unit 30, determiner 40, and display 50 may all be part of a personal electronics device, such as a mobile phone, tablet, desktop or laptop computer, or hand-held camera.

Figure 2:
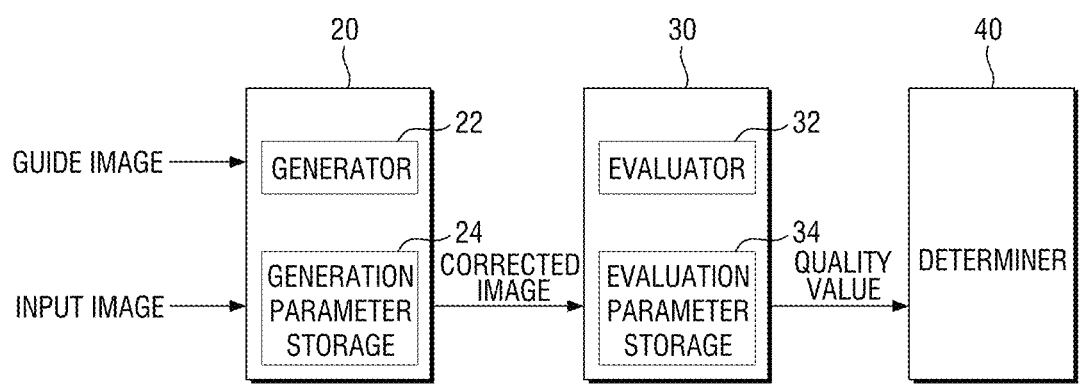
FIG. 2 is a block diagram for explaining an image correction system according to some embodiments of the present disclosure.

FIG. 2 is a block diagram for explaining an image correction system according to some embodiments of the present disclosure.

Referring to FIG. 2, a guide image and an input image are provided to the image generation unit 20. For example, the image generation 20 may be a generator of a GAN and the image evaluation unit 30 may be a discriminator of a GAN.

The image generator 22 generates a corrected image of the input image using the guide image and a pre-learned image generation parameter stored in the generation parameter storage 24. The pre-learned image generation parameter may be a parameter of the generator of the GAN. The pre-learned image generation parameter may be a parameter that is pre-learned and stored before being released as an electronic device including the image correction system. The image generator 22 generates the corrected image so that the image evaluation unit 30 believes the corrected image is the real image. For example, the image generator 22 generates the corrected image that is improved compared to the lack of the input image using the guide image and the pre-learned image generation parameter. The real image may be determined by the type of the input image and the guide image.

The corrected image generated by the image generation unit 20 is input to the image evaluation unit 30.

The image evaluator 32 determines that the corrected image is the real image and generates a quality value of the corrected image using a pre-learned image evaluation parameter stored in the evaluation parameter storage 34. The quality value is a probability the corrected image generated by the image generation unit 20 is the real image. For example, the quality value closer to 1 may indicate a higher probability that the corrected image is the real image and the quality value closer to 0 may indicate a lower probability that the corrected image is the real image.

The quality value of the corrected image generated by the image evaluation unit 30 is input to the determiner 40. The determiner 40 determines whether the quality value of the corrected image is greater than a set value (e.g., by comparing the quality value to the set value). When it is determined that the quality value of the corrected image is greater than the set value, the determiner 40 outputs the corrected image as a final image.

When it is determined that the quality value of the corrected image is less than the set value, the determiner 40 may input the corrected image as an input image to the image generation unit 20, and the above process may be repeated.

For example, a telephoto camera may provide a first image (a tele-image) and a wide-angle camera may provide a second image (a wide image). In this case, a depth map image of a region in which the first image and the second image overlap each other may be formed based on the first image and the second image. However, a depth map image of a region in which the first image and the second image do not overlap each other is not formed.

Accordingly, the image correction system may be provided with the depth map image, which is generated based on the first image and the second image, as an input image and provide an RGB image of the first image as a guide image.

In this case, in order to increase the accuracy of the image correction system, the image correction system may further be provided with a single-image depth map image of the first image as a guide image.

Alternatively, the image correction system may further be provided with a segmentation map image of the second image as a guide image. The segmentation map image may include information for identifying each of objects included in the second image.

The image correction system may output, as a final image, a depth map image of a region in which the first image and the second image do not overlap each other, the depth map image being generated based on the first image and the second image.

As one example, there may be no color information regarding a grayscale image but less noise may be included in the grayscale image, whereas there may be color information regarding an RGB image but brightness of the RGB image may be low and a great deal of noise may be included in the RGB image. Accordingly, the image correction system may be provided with a grayscale image from a mono camera or an infrared camera as a guide image and provide an RGB image from an RGB camera as an input image.

In this case, the image correction system may output, as a final image, an image obtained by improving noise and colors of the RGB image provided as the input image.

As another example, a depth map image generated based on an image from a LiDAR camera may be an image (sparse map), the depth map information of which is relatively accurate and the density of which is low. Accordingly, the image correction system may be provided with the depth map image generated based on the image from the LiDAR camera as an input image, and the RGB image from the RGB camera as a guide image.

In this case, the image correction system may output a depth map image (dense depth map) obtained by improving the density of a low-density depth map image (sparse depth map) provided as an input image.

Figure 3:
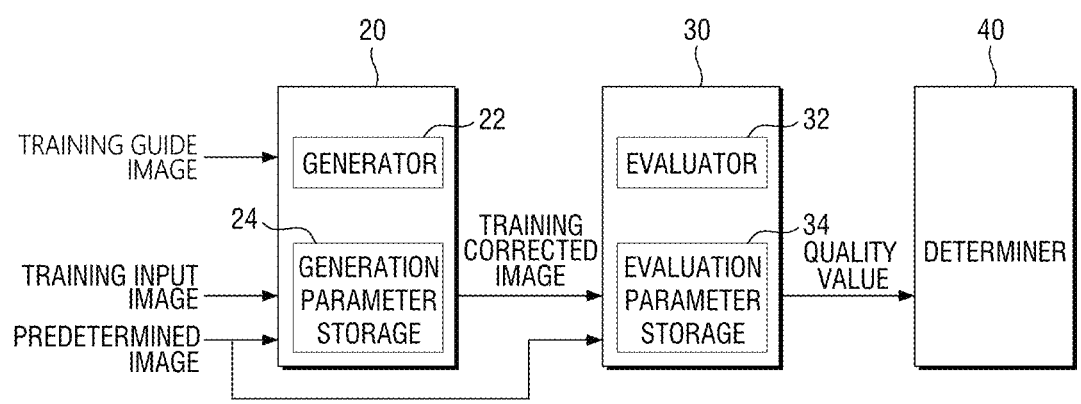
FIG. 3 is a block diagram for explaining an image correction system according to some embodiments of the present disclosure.

FIG. 3 is a block diagram for explaining an image correction system according to some embodiments of the present disclosure. FIG. 3 is a diagram for explaining training of the image correction system of FIG. 2.

Referring to FIG. 3, a training image may be provided to the image generation unit 20. The training image may include a training guide image, a training input image, and a predetermined image.

The predetermined image is a ground truth. The predetermined image may be a reference image or a target image to be generated as a training corrected image by the image generator by receiving the training input image. The image generation unit 20 may be a generator of a GAN and the image evaluation unit 30 may be a discriminator of a GAN. The image generation unit 20 and the image evaluation unit 30 is trained by the GAN training method.

The training guide image and the training input image may be images including the same information as the guide image and the input image.

Referring to the example described above with reference to FIG. 2, in the case of an image correction system for correcting a depth map image generated based on a first image from a telephoto camera and a second image from a wide-angle camera, the depth map image generated based on the first image and the second image may be provided as a training input image, and an RGB image of the first image may be provided as a guide image. In this case, a stereo depth map image of the second image may be provided as a predetermined image.

As another example, in the case of an image correction system for correcting a grayscale image from a mono camera or an infrared camera, the grayscale image from the mono camera or the infrared camera may be provided as a training guide image and an RGB image from an RGB camera may be provided as a training input image. In this case, an RGB image captured by the RGB camera at high illumination may be provided as a predetermined image.

As another example, in the case of an image correction system for correcting a depth map image generated based on an image from a LiDAR camera, the depth map image generated based on the image from the LiDAR camera may be provided as a training input image and an RGB image from the RGB camera may be provided as a training guide image.

The image generator 22 may generate a training corrected image obtained by correcting the training input image using the training guide image. The goal of the image generator 22 may be to generate the training corrected image that is close to the predetermined image. The image generator 22 may calculate a loss of the image generation unit 20 based on the training corrected image and the predetermined image by a loss function. The loss of the image generation unit 20 may include the difference between the training corrected image and the predetermined image. For example, this loss may refer to a loss of data or difference in data between the image output from the image generation unit 20 as the training corrected image, and the predetermined image. For example, the image generator 22 may calculate the loss of the image generation unit 20 by comparing the pixel of the training corrected image and the pixel of the predetermined image, or by comparing the pixel of a region or section of the training corrected image and the pixel of a region or section of the predetermined image. The image generator 22 may be trained to minimize the loss of the image generation unit 20. The pre-learned image generation parameter may be updated to minimize the loss of the image generation unit 20. The training corrected image generated by the image generator 22 is input to the image evaluation unit 30.

The image evaluator 32 may generate a quality value of the training corrected image. The quality value of the corrected image may be a probability that the corrected image generated by the image generation unit 20 is the real image. For example, the quality value of the corrected image is a value between 0 and 1. The quality value closer to 1 may indicate a higher probability that the corrected image is the real image and the quality value closer to 0 may indicate a lower probability that the corrected image is the real image. The image evaluator 32 may be trained to generate the quality value of the predetermined image as 1 and the quality value of the training corrected image with a higher value as the training corrected image is closer to the predetermined image. The goal of the image evaluator 32 may be to correctly determine whether the training corrected image is the predetermined image and correctly generate the quality value of the training corrected image.

The image evaluator 32 may calculate a loss of the image evaluation unit 30 based on the quality value of the training corrected image and the quality value of the predetermined image by the loss function. The loss calculated by the image evaluator 32 may include the difference between the quality value of the training corrected image and a quality value of the predetermined image. The loss calculated by the image evaluator 32 may be used to indicate the correctness for the quality value generated by the image evaluator 32. The image evaluator 32 may be trained to minimize the loss of the image evaluation unit 30. The pre-learned evaluation parameter may be updated to minimize the loss of the image evaluation unit 30.

The image generation unit 20 may be trained to deceive the image evaluator 30, and the image evaluator 30 may be trained to avoid being deceived by the image generation unit 20. Therefore, after the electronic device including the image correction system according to some embodiments of the present disclosure is released, even if there is no predetermined image, the image generation unit 20 may generate the corrected image of the input image using the pre-learned image generation parameter by the generator of the GAN, and image evaluation unit 30 may generate the quality value of the corrected image generated by the image generation unit 20 using the a pre-learned image evaluation parameter by the discriminator of the GAN.

The determiner 40 may determine whether the generation of the training corrected image by the image generation unit 20 and the generation of the quality value of the training corrected image by the image evaluation unit 30 have been performed a set number of times. The set number of times may be set in advance and may be set differently for each image correction system.

Figure 4:
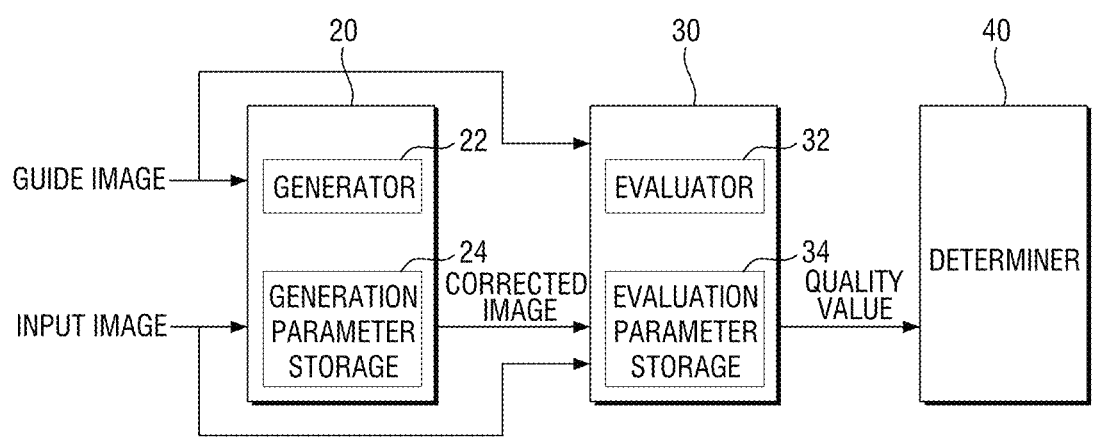
FIG. 4 is a block diagram for explaining an image correction system according to some embodiments of the present disclosure.

FIG. 4 is a block diagram for explaining an image correction system according to some embodiments of the present disclosure. For convenience of explanation, the image correction system of FIG. 4 will be described focusing on differences from the image correction system according to some embodiments of the present disclosure described above with reference to FIG. 2.

Referring to FIG. 4, a corrected image generated by an image generator 22 may be input to an image evaluation unit 30. A guide image and an input image may be further input to the image evaluation unit 30.

An image evaluator 32 may generate a quality value of the corrected image using the guide image and the input image and a pre-learned image evaluation parameter stored in an evaluation parameter storage 34.

Therefore, because the guide image and the input image may be further input to the image correction system according to some embodiments of the present disclosure, the quality of a finally output corrected image may increase although load on the image correction system increases.

Figure 5:
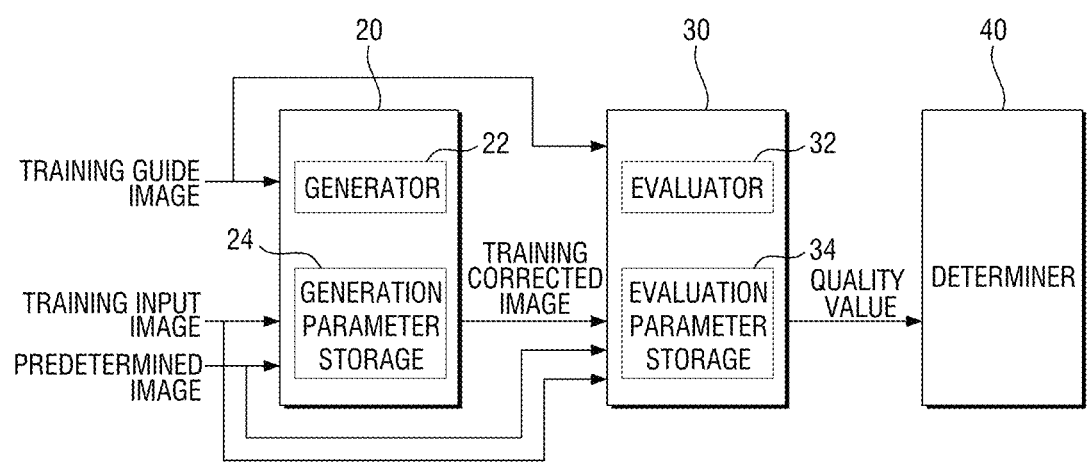
FIG. 5 is a block diagram for explaining an image correction system according to some embodiments of the present disclosure.

FIG. 5 is a block diagram for explaining an image correction system according to some embodiments of the present disclosure. FIG. 5 is a diagram for explaining training of the image correction system of FIG. 4. For convenience of explanation, the training of the image correction system of FIG. 5 will be described focusing on differences from the training of the image correction system according to some embodiments of the present disclosure described above with reference to FIG. 3.

Referring to FIG. 5, a training corrected image generated by the image generation unit 20 and a predetermined image may be input to the image evaluation unit 30. A training guide image and a training input image may be further input to the image evaluation unit 30. The image evaluator 32 may generate a quality value of the training corrected image using the training guide image and the training input image. Therefore, because the training input image is further input to the image evaluator 32, a more accurate quality value of the training corrected image may be generated.

Figure 6:
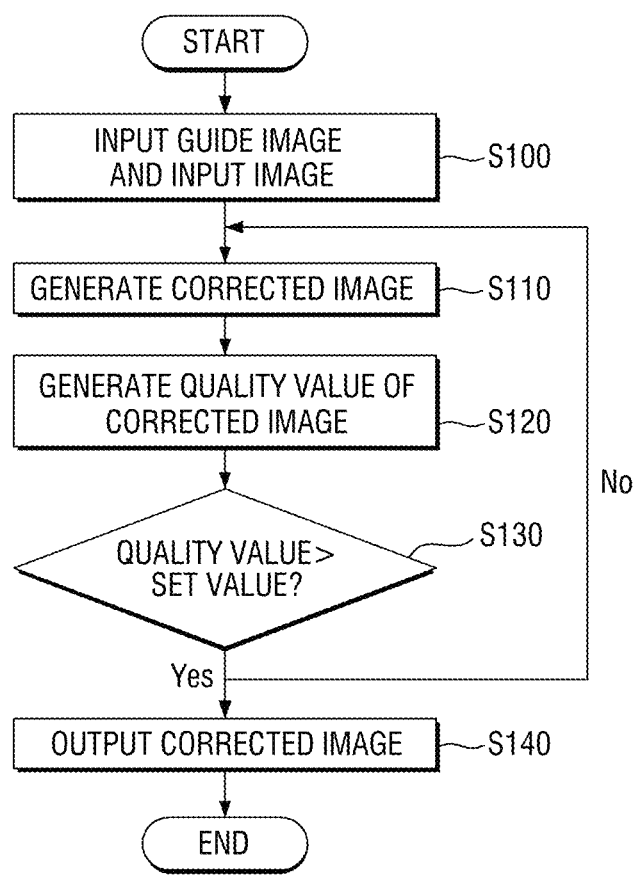
FIG. 6 is a flowchart for explaining an image correction method according to some embodiments of the present disclosure.

FIG. 6 is a flowchart for explaining an image correction method according to some embodiments of the present disclosure.

Referring to FIG. 6, the image correction method according to some embodiments of the present disclosure may be started by inputting a guide image and an input image (S100).

Thereafter, a corrected image may be generated by performing image correction on the input image (S110). The image correction may be performed using the guide image and a pre-learned image generation parameter by a generator of a GAN. The pre-learned image generation parameter may be a parameter of the generator of the GAN.

Thereafter, a quality value of the corrected image may be generated (S120). The quality value of the corrected image may be generated using a pre-learned image evaluation parameter.

Alternatively, in the image correction method according to some embodiments of the present disclosure, the quality value may be generated using the guide image and the corrected image. For example, the image correction system of FIG. 2 may generate the quality value using the pre-learned image evaluation parameter, the guide image, and the corrected image. Thus, although load on the image correction system increases, a quality image of the improved corrected image may be generated.

Thereafter, it may be determined whether the quality value of the corrected image is greater than a set value (S130).

When it is determined that the quality value of the corrected image is greater than the set value (or, that the difference between the quality value of the corrected image and the quality value of the set value is below a predetermined amount), the corrected image may be output as a final image (S140).

When it is determined in operation S130 that the quality value of the corrected image is less than the set value (or, that the difference between the quality value of the corrected image and the quality value of the set value is above a predetermined amount), the method may return to operation S110 and the corrected image may be input as an input image.

In operation S130, in the image correction method according to some embodiments of the present disclosure, it may be further determined whether the generation of the corrected image (S110) and the generation of the quality value of the corrected image (S120) has been performed a set number of times. The set number of times may be set in advance and may be set differently for each image correction system.

In this case, even when the generation of the corrected image (S110) and the generation of the quality value of the corrected image (S120) are not performed the set number of times, the corrected image may be output as a final image when it is determined that the quality value of the corrected image is greater than the set value.

Although it is determined that the quality value of the corrected image is less than the set value, the corrected image may be output as a final image when it is determined that the generation of the corrected image (S110) and the generation of the quality value of the corrected image (S120) are performed the set number of times.

So, in one embodiment, even before the generation of the corrected image (S110) and the generation of the quality value of the corrected image (S120) are performed the set number of times, when it is determined that the quality value of the corrected image is greater than the set value, the corrected image may be output as a final image and the image correction method according to some embodiments of the present disclosure may be ended.

Figure 7:
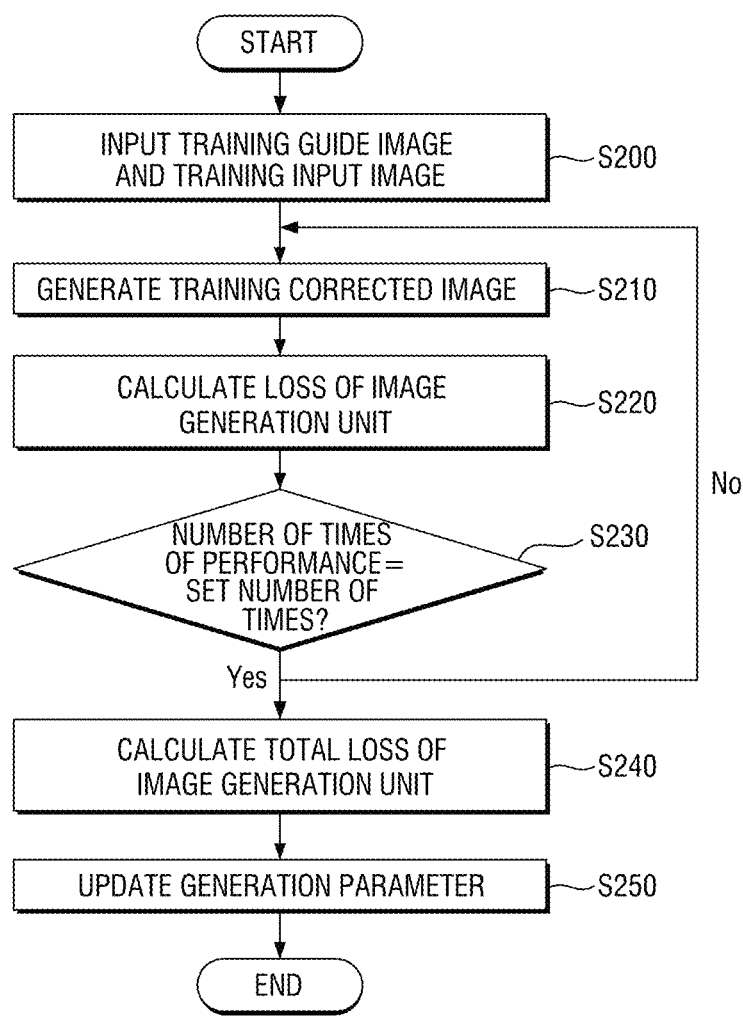
FIG. 7 is a block diagram for explaining a pre-learned image generation parameter according to some embodiments of the present disclosure.

FIG. 7 is a block diagram for explaining forming or updating a pre-learned image generation parameter according to some embodiments of the present disclosure.

Referring to FIG. 7, a method forming or updating a pre-learned image generation parameter according to some embodiments of the present disclosure may be started by inputting a training guide image and a training input image (S200).

A training corrected image may be generated by correcting a training input image using a training guide image (S210). The training corrected image may be generated by a generator of a GAN.

Thereafter, a loss of an image generation unit (e.g., loss of an image output from the image generation unit) may be calculated (S220). The loss of the image generation unit may be calculated using the training input image and a predetermined image. The loss of the image generation unit may include the difference between the training corrected image and the predetermined image. For example, the loss of the image generation unit may be calculated by comparing the pixel of the training corrected image and the pixel of the predetermined image, or by comparing the pixel of a region or section of the training corrected image and the pixel of a region or section of the predetermined image.

For example, the loss of the image generation unit may be calculated using Equation 1 below.

$$L_i = \sum_{x,y \in M_i} \frac{|T_0(X, Y) - GT(X, Y)|^2}{|M_i|} \quad \text{[Equation 1]}$$

Here, $L_i$ may represent a loss of an image generation unit calculated a set number of times i by a loss function, and $M_i$ may represent a region or section of a training input image corresponding to the set number of times i. $T_0(X, Y)$ may represent a training corrected image, and $GT(X, Y)$ may represent a predetermined image.

Thereafter, it may be determined whether the generation of the training corrected image (S210) and the calculation of the loss of the image generation unit (S220) have been performed the set number of times (S230).

When it is determined that the generation of the training corrected image (S210) and the calculation of the loss of the image generation unit (S220) are not performed the set number of times, the method returns to operation S210 and the training corrected image may be input as a training input image. Operations S210 and S220 may be performed the set number of times.

When it is determined that the generation of the training corrected image (S210) and the calculation of the loss of the image generation unit (S220) are performed the set number of times, a total loss of the image generation unit may be calculated (S240).

The total loss of the image generation unit may be calculated using losses of the image generation unit calculated the set number of times and a weight. For example, the total loss may be calculated using Equation 2 below.

$$\text{Total Loss} = = \sum_{i=1}^{i=n} \lambda_i L_i \quad \text{[Equation 2]}$$

Here, n may represent the set number of times (n being a natural number). $L_i$ may represent the i-th loss of the image generation unit calculated in operation S220, and $\lambda_i$ may represent the i-th weight. The weight may be set differently according to each of the set number of times. The weight may be increased as, for example, the distance between a region or section of the training input image and the predetermined image decreases. For example, in the case of a depth map image generated based on a first image from a telephoto camera and a second image from a wide-angle camera as described above with reference to FIG. 2, the weight may be increased as the difference between the training input image and a region for which a depth map image is generated due to overlapping of the first and second images therein decreases.

For example, the weight may be set to be larger as i is smaller. Because the training corrected image generated by the image generation unit by receiving the training input image may be input again as a training input image, the training input image may be changed while image correction is performed the set number of times. Therefore, because the training input image may include a more accurate image as i is smaller, the weight may be set to be larger as i is smaller.

This is because the reliability of an image is higher as the distance between the image and a region for which the depth map image is generated decreases.

This is because a training corrected image may be changed as a process of generating a training corrected image by receiving a training input image is repeatedly performed.

Thereafter, the pre-learned image generation parameter (e.g., pre-trained image generation parameter) may be updated based on the total loss of the image generation unit (S250). The pre-learned image generation parameter may be updated to reduce the total loss of the image generation unit using backward propagation. For example, the total loss of the image generation unit may be propagated in a backward direction from the output layer toward the input layer of the neural network in the image generation unit. The pre-learned image generation parameter may be iteratively updated based on the total loss of the image generation unit so that the image generation unit becomes better at generating the corrected image that could fool the image evaluation unit.

Figure 8:
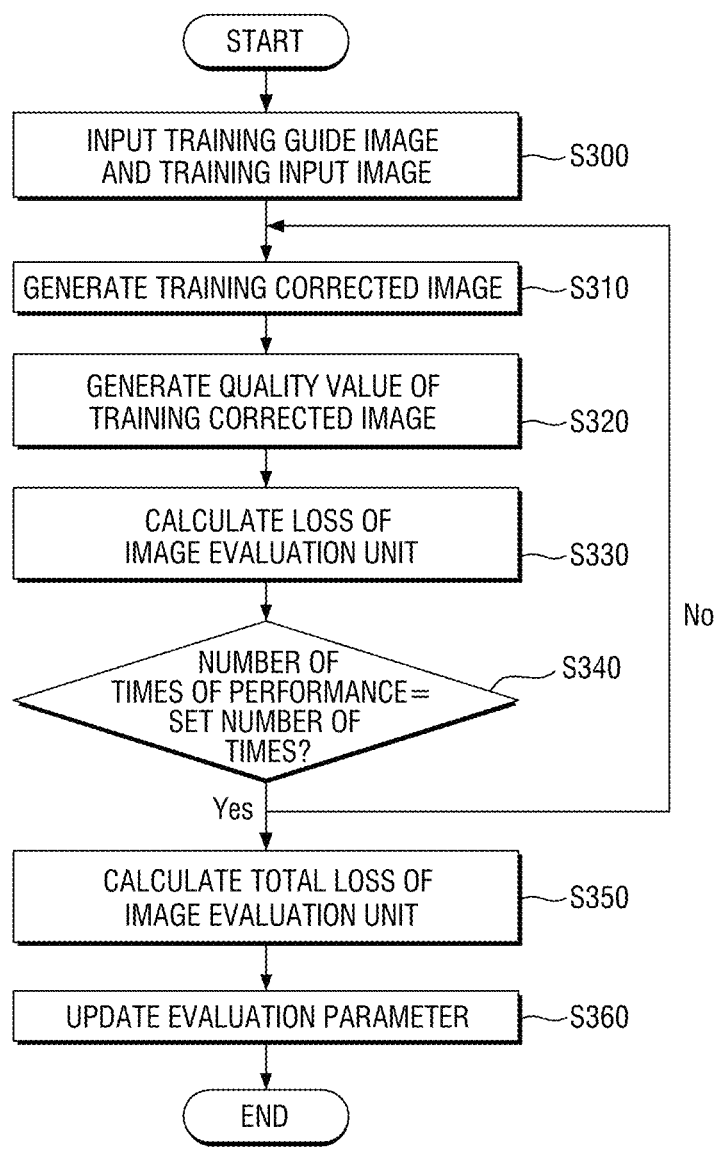
FIG. 8 is a flowchart for explaining a pre-learned image generation parameter according to some embodiments of the present disclosure.

FIG. 8 is a flowchart for explaining forming or updating a pre-learned image evaluation parameter according to some embodiments of the present disclosure.

Referring to FIG. 8, a method forming or updating a pre-learned evaluation parameter according to some embodiments of the present disclosure may be started by inputting a training guide image and a training input image (S300).

A training corrected image may be generated by correcting the training input image using the training guide image (S310). The training corrected image may be generated by a generator of a GAN. Next, the training corrected image may be input and a quality value thereof may be generated (S320). The quality value may be generated by a discriminator of the GAN.

Next, a loss of the image evaluator including a difference between the training corrected image and the predetermined image may be calculated. (S330). The loss of the image evaluator may be a measure of the correctness of the quality value generated by the image evaluation unit.

Next, it may be determined whether the generation of the training corrected image (S310), the generation of the quality value of the training corrected image (S320), and the calculation of the loss of the image evaluator including a difference between the training corrected image and the predetermined image (S330) are performed a set number of times (S340). The set number of times may be set in advance and may be set differently for each image correction system.

At step 340, when it is determined that the generation of the training corrected image (S310), the generation of the quality value of the training corrected image (S320), and the calculation of the loss of the image evaluator including a difference between the training corrected image and the predetermined image (S330) are not performed the set number of times, the method may return to operation S310 and the training corrected image may be input as a training input image. Operations S310 to S330 may be performed the set number of times.

At step 340, when it is determined that the generation of the training corrected image (S310), the generation of the quality value of the training corrected image (S320), and the calculation of the loss of the image evaluator including a difference between the training corrected image and the predetermined image (S330) are performed the set number of times, a total loss of the image evaluation unit may be calculated (S350).

The total loss of the image evaluation unit may be calculated using losses of the image evaluation unit calculated the set number of times and a weight.

Thereafter, a pre-learned (e.g., pre-trained) evaluation parameter may be updated based on the total loss of the image evaluation unit (S360). The pre-learned evaluation parameter may be updated to reduce the loss of the image evaluation unit using the backward propagation. For example, the loss of the image evaluation unit may be propagated in a backward direction from the output layer toward the input layer of the neural network in the image evaluation unit. The pre-learned evaluation parameter may be iteratively updated based on the total loss of the image evaluation unit.

Figure 9:
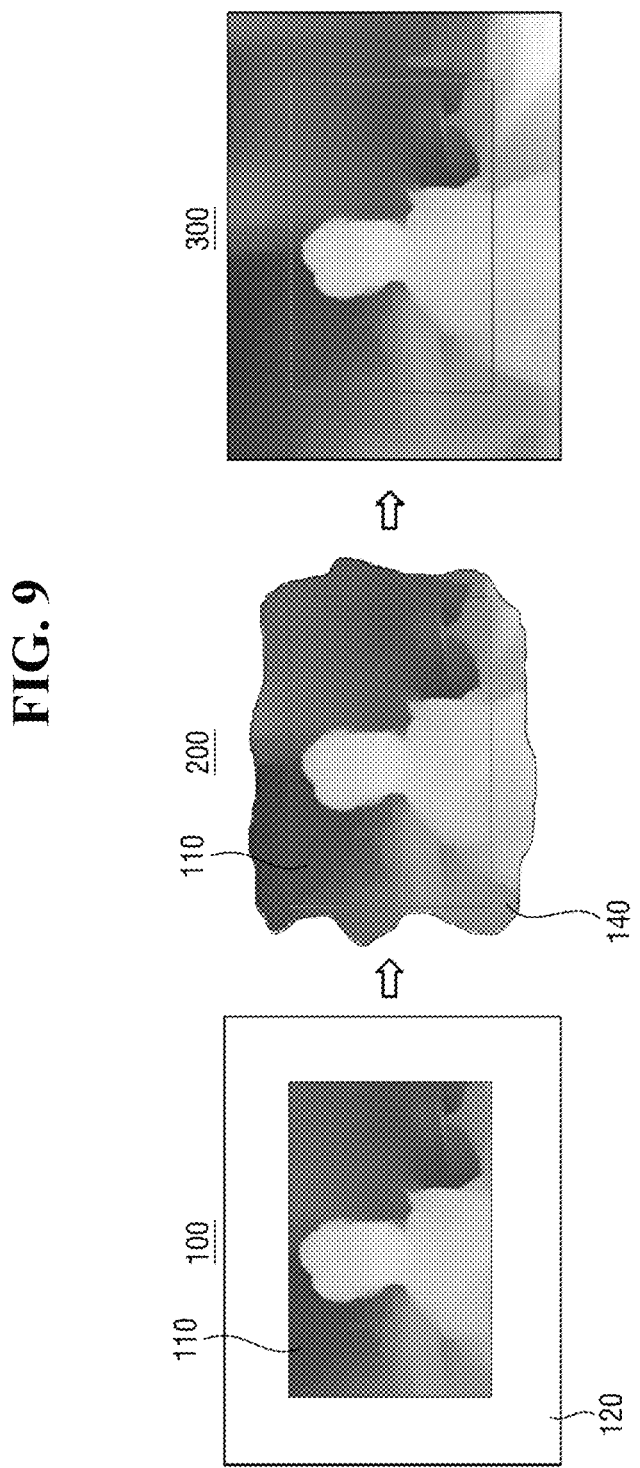
FIG. 9 illustrates an example of applying an image correction system according to some embodiments of the present disclosure.

FIG. 9 illustrates an example of applying an image correction system according to some embodiments of the present disclosure. FIG. 9 is a diagram illustrating an example of applying a depth map image generated based on a first image from a telephoto camera and a second image from a wide-angle camera as described above with reference to FIG. 2 to an image correction system according to some embodiments of the present disclosure.

A depth map image 100 formed based on the first image and the second image is provided as an input image to the image correction system. The depth map image 100 may include a first depth map image 110 of a region in which the first image and the second image overlap each other and a second depth map image 120 of a region in which the first image and the second image do not overlap each other. The first depth map image 110 may be generated because the first image and the second image overlap, but the second depth map image 120 may not be generated because the first image and the second image do not overlap.

An RGB image of the second image may be provided as a guide image to the image correction system. A single depth map image of the second image may be further provided as a guide image to the image correction system.

The image correction system generates a corrected depth map image 200 obtained by correcting the depth map image 100 using the pre-learned image generation parameter by a generator of a GAN. The second depth map image 120 may be corrected using the pre-learned image generation parameter by the generator of the GAN and the corrected second depth map image 140 may be generated. The image correction system may perform image correction to correct the second depth map image 120 and generate a final output image 300.

Figure 10:
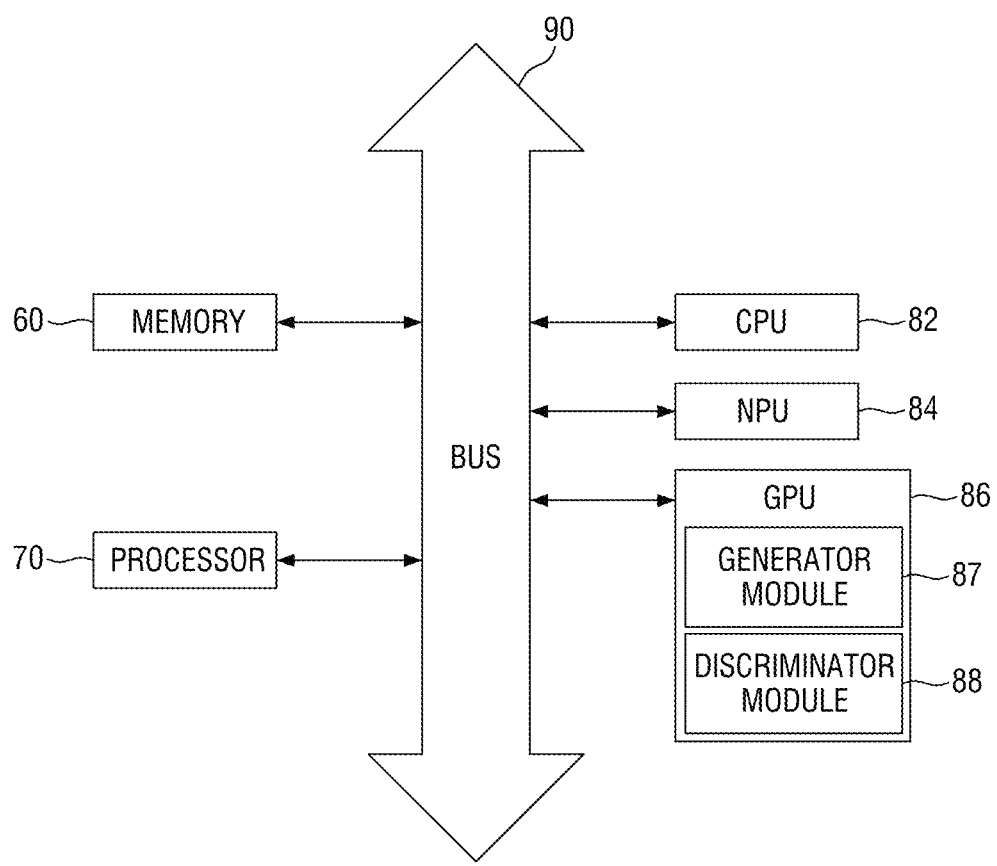
FIG. 10 is a diagram for explaining an electronic device according to some embodiments of the present disclosure.

FIG. 10 is a diagram illustrating an electronic device according to some embodiments of the present disclosure.

Referring to FIG. 10, the electronic device may include a memory 60 and a processor 70. The memory 60 and the processor 70 are connected to, for example, a central processing unit (CPU) 82, a neural network processing unit (NPU) 84, and a GAN network processing unit (GPU) 86 via a bus 90.

The memory 60 may store an image correction program according to some embodiments of the present disclosure. The memory 60 may store a learned (e.g., trained) image generation parameter and a learned image evaluation parameter according to some embodiments of the present disclosure.

The processor 70 may execute an image correction program, for example, via the CPU 82, the NPU 84, or the GPU 86. The processor 70 may generate a corrected image from an input image using a guide image. The generation of the corrected image may include generating a corrected image using an image generation parameter learned using a learned image.

The processor 70 may generate a corrected image by performing image correction on the input image, for example, through a generator module 87 of the GPU 86. The processor 70 may generate a quality value of the corrected image using a pre-learned evaluation parameter.

The processor 70 may generate the quality value of the corrected image, for example, via a discriminator module 88 of the GPU 86.

The discriminator module 88 of the GPU 86 may further receive, for example, a guide image and an input image to generate the quality value of the corrected image.

The processor 70 may repeatedly perform image correction on the corrected image using the guide image until the quality value of the corrected image becomes greater than a set value.

The processor 70 may repeatedly perform image correction, for example, through the GPU 86 until the quality value of the corrected image becomes greater than the set value.

The processor 70 may allow the image generation parameter and the image evaluation parameter to be learned in advance through, for example, the CPU 82, the NPU 84, or the GPU 86.

The image generation parameter may be learned in advance through, for example, the generator module 87 of the GPU 86. The generator module 87 of the GPU 86 may receive a training guide image and a training input image to allow the image generation parameter to be learned in advance.

The image evaluation parameter may be learned in advance, for example, via the discriminator module 88 of the GPU 86. The discriminator module 88 of the GPU 86 may receive, for example, a predetermined image and a training corrected image to allow the image evaluation parameter to be learned in advance.

The discriminator module 88 of the GPU 86 may further receive, for example, a training guide image and a training input image to generate a quality value of the corrected image.

As is traditional in the field of the disclosed technology, features and embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts. Further, the blocks, units and/or modules of the embodiments may be physically or logically combined into more complex blocks, units and/or modules without departing from the scope of the inventive concepts.

What is claimed is:

1. An image correction method comprising:
receiving an input image from a first camera;
receiving a guide image from a second camera;
generating a corrected image by performing image correction on the input image using the guide image, the image correction being performed by an image generation unit having a pre-learned image generation parameter learned using a training image;
generating a quality value of the corrected image by an image evaluation unit having a pre-learned image evaluation parameter learned using the training image; and
performing the image correction on the corrected image again when the quality value of the corrected image is less than a set value, and outputting the corrected image as a final image when the quality value of the corrected image is greater than the set value.

2. The image correction method of claim 1, wherein the generating of the quality value of the corrected image comprises generating the quality value using the guide image, the input image, and the pre-learned image evaluation parameter.

3. The image correction method of claim 1, wherein the training image comprises a training guide image, a training input image, and a predetermined image, and
the image correction method further comprises:
generating a training corrected image by receiving the training guide image and the training input image and correcting the training input image; and
calculating a loss of the image output from the image generation unit using the training corrected image and the predetermined image, the loss including a difference between the training corrected image and the predetermined image,
wherein the generating the training corrected image and the calculating the loss of the image output from the image generation unit are repeatedly performed a set number of times using the training corrected image as a training input image.

4. The image correction method of claim 3, further comprising:
after repeatedly performing the generating the training corrected image and the calculating the loss of the image output from the image generation unit the set number of times, calculating a total loss of the image generation unit using losses of the images output from the image generation unit calculated the set number of times and a weight; and
updating the pre-learned image generation parameter, based on the total loss of the image generation unit.

5. The image correction method of claim 4, wherein the weight is differently set according to the set number of times.

6. The image correction method of claim 3, further comprising:

generating a quality value of the training corrected image by receiving the training corrected image; and calculating a loss of the image evaluation unit using the training corrected image and the predetermined image, the loss of the image evaluation unit including a difference between the training corrected image and the predetermined image, wherein the generating the quality value of the training corrected image and the calculating a loss of the image evaluation unit are repeatedly performed the set number of times using the training corrected image as a training input image.

7. The image correction method of claim 6, further comprising:

after repeatedly performing the generating the quality value of the training corrected image and the calculating a loss of the image evaluation unit the set number of times, calculating a total loss of the image evaluation unit using losses of the image evaluation unit calculated the set number of times and a weight.

8. The image correction method of claim 3, further comprising:

generating a quality value of a training corrected image by receiving the training corrected image; and calculating a loss of the image evaluation unit using the training input image, the training corrected image and the predetermined image, the loss of the image evaluation unit including a difference between the quality value of the training corrected image and a quality value of the predetermined image, wherein the generating a quality value of the training corrected image and the calculating a loss of the image evaluation unit are repeatedly performed the set number of times by receiving the training corrected image.

9. The image correction method of claim 8, further comprising:

after repeatedly performing the generating a quality value of the training corrected image and the calculating a loss of the image evaluation unit the set number of times, calculating a total loss of the image evaluation unit using losses of the image evaluation unit calculated the set number of times and a weight.

10. An image correction system comprising:

an image generation unit comprising:
an image generation parameter storage configured to store a pre-learned image generation parameter; and
an image generator configured to receive a guide image and an input image and generate a corrected image by correcting the input image using the pre-learned image generation parameter and the guide image;

an image evaluation unit comprising:
an image evaluation parameter storage storing a pre-learned image evaluation parameter; and
an image evaluator configured to receive the corrected image and generate a quality value of the corrected image using the pre-learned image evaluation parameter ; and a determiner configured to output the corrected image when it is determined that the quality value is greater than a set value and input the corrected image as an input image to the image generation unit when it is determined that the quality value is less than the set value.

11. The image correction system of claim 10, wherein the image evaluator further receives the guide image and the input image and generates the quality value using the guide image and the input image.

12. The image correction system of claim 11, wherein the image generation parameter is determined by generating a training corrected image through correction of the training input image by providing a training guide image and a training input image to the image generator, and calculating a loss of the image generation unit, which includes a difference between the training corrected image and a predetermined image on the basis of the calculated loss of the image generation unit.

13. The image correction system of claim 12, wherein the image generation parameter is determined by repeatedly performing the generation of the training corrected image as a training input image and the calculation of the loss of the image generation unit a set number of times.

14. The image correction system of claim 13, wherein the image evaluation parameter is determined by generating the quality value of the training corrected image by providing training guide image, the training input image, and the training corrected image to the image evaluator, calculating a loss of the image evaluator which includes a difference between the training corrected image and the predetermined image on the basis of the calculated loss of the image evaluator.

15. The image correction system of claim 14, wherein the image evaluation parameter is determined by repeatedly performing the generation of the quality value of the training corrected image and the calculation of the loss of the image evaluator the set number of times.

16. The image correction system of claim 10, wherein the image generation parameter is determined by generating a training corrected image through correction of the input image by providing a training guide image and a training input image to the image generator, calculating a loss of the image generation unit, which includes a difference between the training corrected image and a predetermined image on the basis of the calculated loss of the image generation unit.

17. The image correction system of claim 16, wherein the image generation parameter is determined by repeatedly performing the generation of the training corrected image as the training input image and the calculation of the loss of the image generation unit a set number of times.

18. The image correction system of claim 17, wherein the image evaluation parameter is determined by generating a quality value of the training corrected image by inputting the training corrected image to the image evaluator, calculating a loss of the image evaluator, which includes a difference between the training corrected image and the predetermined image on the basis of the calculated loss of the image evaluation unit.

19. The image correction system of claim 18, wherein the image evaluation parameter is determined by repeatedly performing the generation of the quality value of the training corrected image and the calculation of the loss of the image evaluator the set number of times.

20. An electronic device comprising:

a memory storing an image correction program; and
at least one processor configured to execute the image correction program stored in the memory,
wherein the image correction program is configured to generate, by the at least one processor, a corrected image from an input image using a guide image, generate a quality value of the corrected image, and perform image correction on the corrected image using the guide image until the quality value becomes greater than a set value, wherein the generation of the corrected image comprises generating the corrected image using a pre-learned image generation parameter learned using a training image, and wherein the generation of the quality value is performed by an image evaluation unit having a pre-learned image evaluation parameter learned using the training image.

* * * * *